Sept. 10, 1929.  W. L. PATTERSON  1,727,900
OPTICAL PROJECTION DEVICE
Filed Jan. 30, 1926  3 Sheets-Sheet 1

INVENTOR.
William L. Patterson
BY Crumpston & Griffith
his ATTORNEY

Sept. 10, 1929.  W. L. PATTERSON  1,727,900
OPTICAL PROJECTION DEVICE
Filed Jan. 30, 1926  3 Sheets-Sheet 2
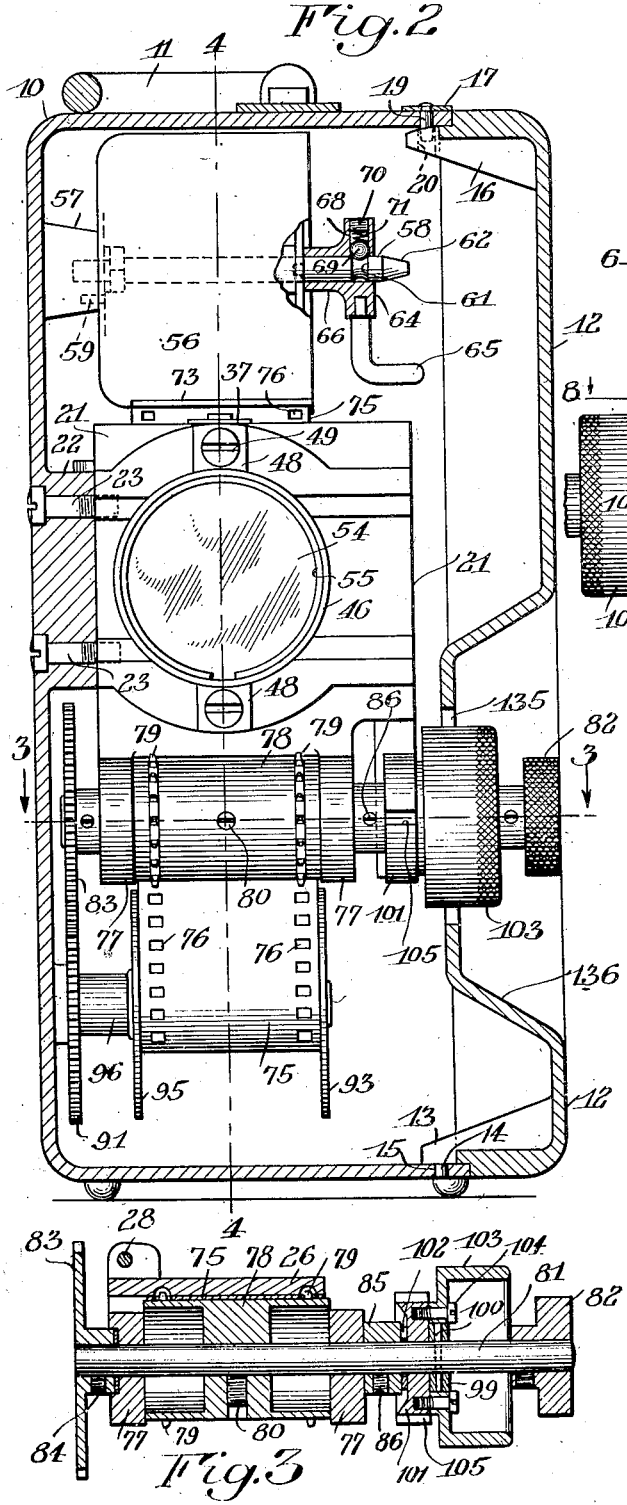
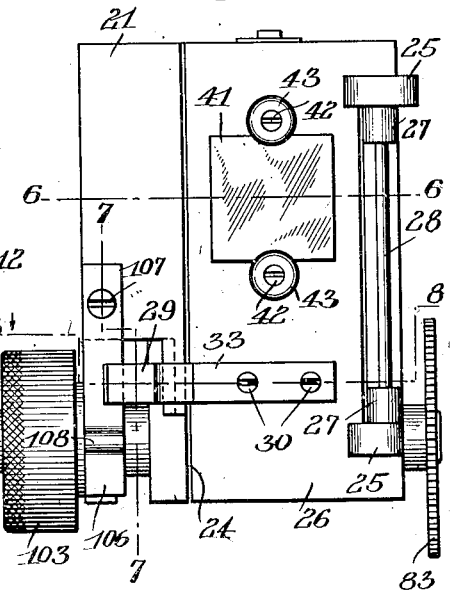
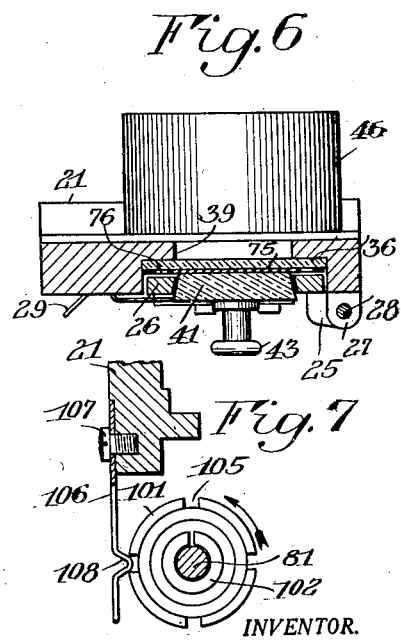
INVENTOR.
William L. Patterson
BY
his ATTORNEY Sept. 10, 1929.  W. L. PATTERSON  1,727,900
OPTICAL PROJECTION DEVICE
Filed Jan. 30, 1926   3 Sheets-Sheet 3
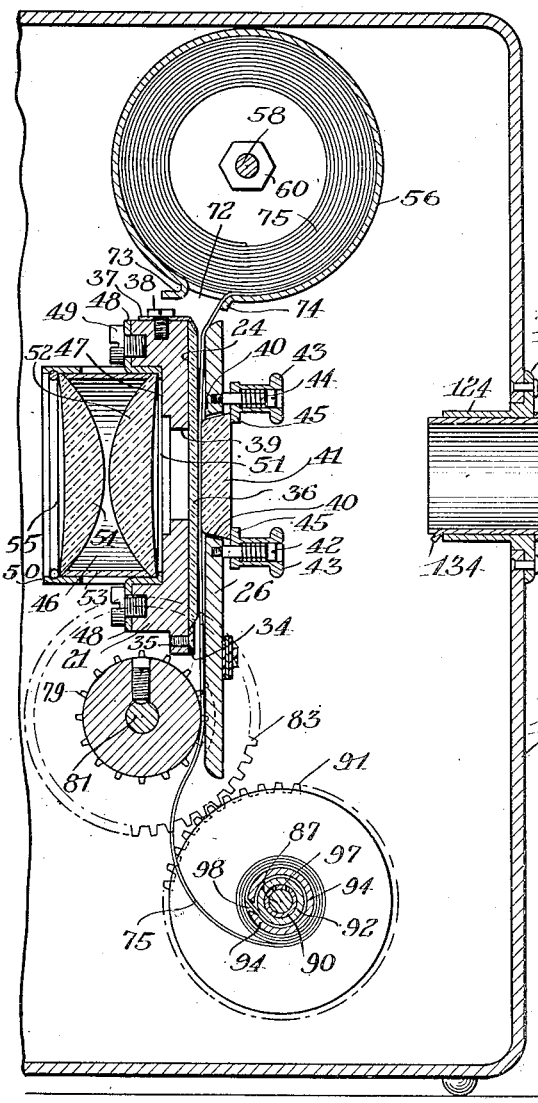
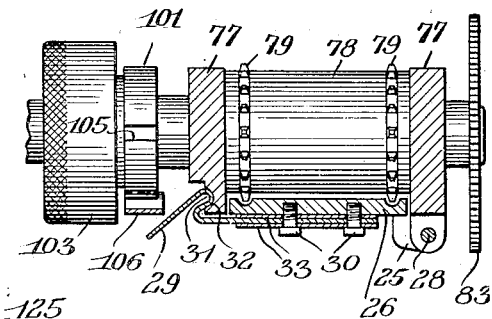
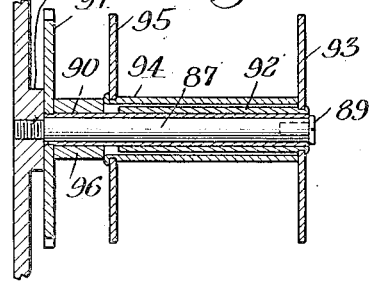
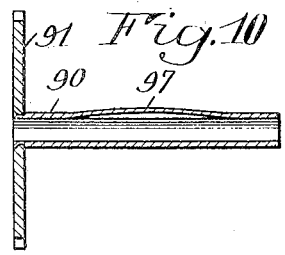
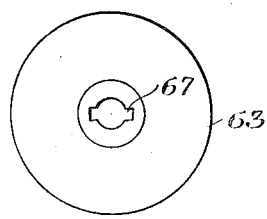
INVENTOR.
William L. Patterson
BY
his ATTORNEY Patented Sept. 10, 1929.

1,727,900

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

OPTICAL PROJECTION DEVICE.

Application filed January 30, 1926. Serial No. 84,870.

This invention relates to the art of optical projection, and more particularly to projection devices of the stereopticon type. Heretofore such devices have been utilized largely for commercial exhibition purposes, and required the services of an experienced operator and the use of expensive slides that were relatively bulky and fragile. The relatively high cost of such devices and slides also restricted the fields in which their use might be advantageous.

An object of the invention is to provide an improved projection device which may be operated from the ordinary commercial electric lighting sources of current; which may be easily packed in a case without troublesome projections; which may be operated with safety by relatively unskilled persons; which is portable, compact, safe from fire hazards; which may utilize roll film either with or without a spool core; and which is relatively simple and inexpensive in construction.

A further object of the invention is to provide an improved projection device with which the picture sections of the film may be moved through projection positions successively in a simple and convenient manner; with which the proper placing of the film sections in projection positions will be effectively indicated; with which the framing may be varied in a simple manner; and with which the insertion and removal of the films may be accomplished in a simple and rapid manner and without great care or attention in making the connection between the film and its operating mechanism;

A further object is to provide simple and effective controlling and operating means for the film while in use; with which the picture sections of the film will be held flat or undeformed while in projection positions, and which will offer a minimum interference or opposition to the normal movements of the film;

A further object is to provide a satisfactory but simplified focussing mounting for the objective lens.

Various other objects and advantages will be apparent from the following description of an embodiment of the invention, and the novel features will be particularly pointed out hereinafter in connection with the appended claims.

In the accompanying drawing:

Figure 2 is a transverse sectional elevation of the same, with the section taken approximately along the line 2—2 of Figure 1;

Figure 3 is a sectional plan of a portion of the same, with the section taken approximately along the line 3—3 of Figure 2;

Figure 4 is a sectional elevation through a portion of the device, with the section taken approximately along the line 4—4 of Figure 2;

Figure 5 is an elevation of the film guide;

Figure 6 is a sectional plan of the same, with the section taken approximately along the line 6—6 of Figure 5;

Figure 7 is a sectional elevation of a portion of the same, with the section taken approximately along the line 7—7 of Figure 5, and showing particularly the framing indicating mechanism;

Figure 8 is a sectional plan through the film guide, with the section being taken approximately along the line 8—8 of Figure 5 and illustrating the mechanism for propelling the film through the guide;

Figure 9 is a sectional elevation through the film receiving spool;

Figure 10 is a sectional elevation of a portion of the same; and Figure 11 is an end elevation of a film supply spool which may be employed.

Figure 1:
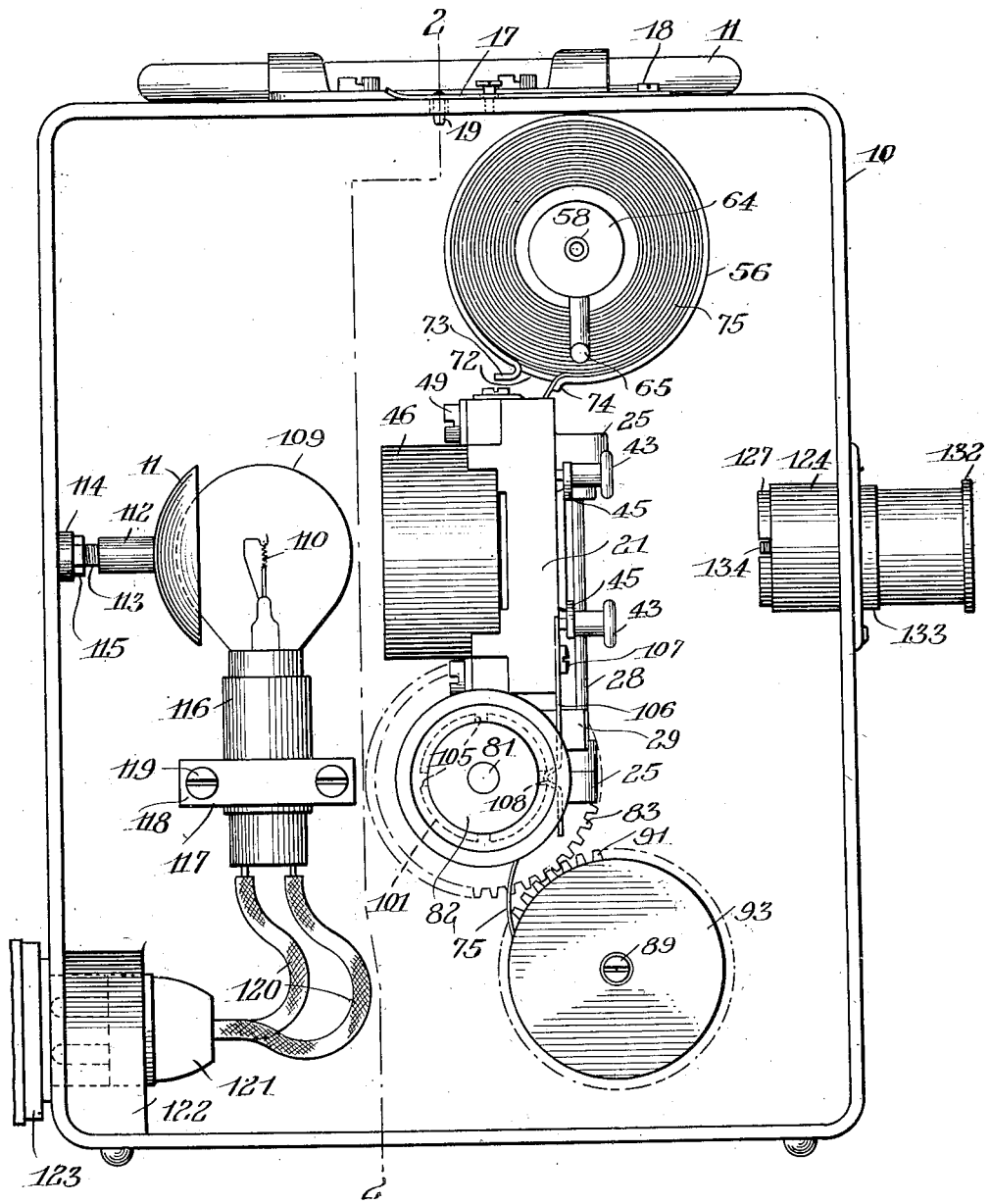
Figure 1 is a side elevation of a projection device, constructed in accordance with the invention and having the closure removed in order to show the interior of the device.

Similar reference numerals throughout the several views indicate the same parts.

In the illustrated embodiment of the invention, the mechanism is largely enclosed within a suitable casing 10, which may have a handle 11, hinged thereon so that it may lie flat against the top of the casing when not in use, as shown in Figures 1 and 2. An open side wall of the casing is normally closed by a suitable closure 12, having along its lower edge, lugs 13 which project over the bottom wall of the casing and carry depending studs 14. The studs 14 may enter apertures or depressions 15 in the bottom wall of the casing, and prevent removal of the closure along the bottom edge. A lug 16 may extend from the inner face of the closure beneath the upper wall of the casing. A leaf spring 17, at one end may be secured in any suitable manner, such as by screws 18, upon the upper face of the upper wall of the casing, and its free end may be provided with a depending stud 19 which passes through an aperture in the upper wall of the casing and enters a recess 20 in the lug 16 of the closure, so as to lock the closure to the casing. By flexing upwardly the free end of the leaf spring the stud 19 may be withdrawn from the lug 16 to unlock the closure 12. Thus, when the stud 19 is withdrawn, the upper edge of the closure may be swung outwardly, and then the closure may be lifted to carry the studs 14 out of the apertures or depressions 15 in the bottom wall of the casing, thereby completing the removal of the closure.

A relatively thick plate 21 is secured edgewise against a lug or abutment 22 that projects from the side wall of the casing which is opposite the closure, the plate 21 being secured thereto in any suitable manner, such as by screws 23 which pass through the wall of the casing and are threaded into the abutting edge of the plate. The plate is spaced from the upper and lower ends of the casing, and is provided along one face with a groove or channel 24, which extends vertically for the entire length of the plate. The plate, upon the face having the channel, may be provided with hinged lugs 25, and a door 26 is mounted by hinge lugs 27 upon a pintle 28 that extends between the hinge lugs 25. This door 26 may be swung into and out of a position in which it substantially closes the open face of the channel. Preferably, the hinged edge of the door is adjacent to the wall of the casing opposite the closure, so that when the door is swung to open position, the channel will be readily accessible through the open face of the casing.

A latch spring 29 may be secured to the free side of the door in any suitable manner, such as by screws 30, and extends outwardly beyond the end of the door. This spring 29, at its free end may be offset laterally and slightly rearwardly as at 31, so as to snap into a notch 32 in a side edge of the plate 21 when the door is swung into closed position. The extreme end of the spring 29 preferably extends outwardly from the depression 32 for a short distance, so as to serve as a convenient handle by which it may be flexed in causing its disengagement from the notch 32 to permit of the opening of the door 26. If desired, a portion of the spring adjacent to its fixed end may be reinforced upon one or both faces by spring strips 33 which will prevent sharp bending of the spring 29 at points closely adjacent to the screws 30.

A strip 34 (Fig. 4) of suitable material may be secured along the lower edge of the plate 21 and within the channel in any suitable manner, such as by small screws 35 which pass through the strip 34 and are threaded into the plate 21. Preferably, the heads of these screws are countersunk within the strip so as to be flush therewith. The upper edge of the strip is undercut so as to receive the bevelled lower edge of a transparent plate 36 which is disposed against the bottom wall of the channel 24. This transparent plate may be of any suitable material, such as glass, and at its upper end may be confined to the plate by a clip 37, which is secured by a screw 38 to the upper end of the plate 21, and overlies the upper bevelled edge of the transparent plate.

The plate 21 is provided with a window 39 which is closed by the transparent plate 36, and the door 26 is provided with an open window 40 which is aligned with the window 39. The window 40 of the door is normally closed by a transparent member 41 which may be in the nature of a block of clear glass. The member 41 is movable to a limited extent through the open window 40. Preferably the wall of the opening 40 is inwardly convergent or bevelled and the periphery of the block or plate 41 is also somewhat convergent or bevelled, so that while the block or plate may move through the window or opening 40 to some extent, it cannot be shifted entirely therethrough. The block or plate 41 however, should be materially thicker than the door 26 in which it is mounted, and normally projected into the channel and against the transparent plate 24 which backs the channel.

The door is provided with suitable screws or headed studs 42, which project outwardly from the outer face at points adjacent to the window 40. Buttons 43 are slidably mounted on the studs 42, including the heads of the studs. Each button, at its inner end, closely fits the shank of the stud or screw 42, and from the other end and for the major portion of its length has an interior chamber which slides freely upon the head of the screw or stud, as shown in Figure 4. Helical compression springs 44 are disposed around the shanks or studs of the screws 42 and within the interior chambers of the buttons, and are confined between the inner ends of the buttons and the heads of screws, so as to normally urge the buttons toward the door. The inner ends of the buttons are flanged as at 45, so as to overlie the block or plate 41 which fills the window 40, and therefore serve to yieldingly press the block or plate 41 through the window and into the channel. The flanges 45 do not extend entirely around the entire periphery of the buttons, so that when the buttons are rotated upon the studs 42, the flanges 45 may be carried out of overlapping engagement with the plate or block 41 and permit of the removal of the latter from the window.

A suitable condensing lens device 46 may be secured upon the rear face of the plate 21 and in alignment with the windows 39 and 40. For example, the rear face of the plate 21 may be provided with a depression 47 in which the lens device is received, the outer shell of the lens device preferably having struck out ears 48 which fit against the rear face of the plate and are secured thereto such as by screws 49 which pass through the ears 48 and into the plate. The condensing lens device 46 may be of any suitable construction, but in the form illustrated includes an open ended cylindrical shell 50 from the wall of which the ears 48 are struck. The shell 50 is received in the groove or depression 47, and at its inner end may be flanged inwardly as at 51 to provide an abutment against which one of the lens elements 52 may be confined by a sleeve 53 which is telescopically received in the shell. A second lens element 54 may be confined against the sleeve 53 in any suitable manner, such as by a split ring 55 which may be sprung into an internal annular groove in the outer end of the shell 50.

A cup-shaped shell 56, preferably of metal, is secured by its bottom wall against an abutment 57 of the side wall of the casing opposite the closure, so that the open face of the cup-shaped shell 56 will extend toward the closure. The shell 56 is disposed directly above the plate 21 and may be secured against the abutment by a stud 58 which passes through an opening in the bottom wall of the shell and is threaded into the abutment 57. A stud 59 projecting outwardly from the bottom wall of the shell 56 may enter a recess in the abutment 57 so as to prevent rotation of the shell upon the stud 58. A nut or collar 60 carried by the stud 58 engages with the bottom of the shell and confines it to the casing, the stud extending axially of the shell and somewhat beyond its open face, as shown in Figure 2. Adjacent to its outer end the stud is provided with an annular groove 61, and the extreme outer end is tapered as at 62.

A spool 63 (Figs. 2 and 11) may be rotatably mounted upon the stud 58 within the shell 56, and confined within the shell by an operating element 64 having an operating crank handle 65. The operating element 64 may have an axial hub or boss 66 which may be removably clutched to the abutting end of the spool 63. For example, the end of the spool may have one or more depressions 67 (Fig. 11) in which corresponding projections on the end of the boss 66 may engage in order to form a driving connection between the operating element 63 and the spool.

The operating element may be removably confined upon the stud 58 in any suitable manner, so as to permit of removal of the spool. For example, the element 64 may be provided with a radially extending passage 68 (Fig. 2) containing a ball 69. The outer end of the passage 68 is closed by a plug 70, and a compression spring 71 confined between plug 70 and the ball 69 serves to hold the ball yieldingly at the inner end of the passage, which inner end is slightly restricted in order to prevent the projection of the ball entirely out of the passage and into the bore of the element when the latter is removed from the stud 58. The spring 71 serves to press the ball somewhat into the bore in the element 64 and into the annular groove 61, and thus yieldingly hold the operating element against endwise movement along the stud without restricting its rotary movement thereon. Thus the spool may be rotated by merely rotating the operating element 64 through its handle 65, and may be released for removal by applying sufficient pressure to the operating element in a direction endwise of the stud 58. The tapered end 62 of the stud serves to guide the ball out of the bore of the operating element when the latter is reapplied to the stud.

The casing 56 is provided with a slit 72 in its lateral wall at a point adjacent to the end of the channel or groove 24, and the portions of the shell along the slit are flanged outwardly and rearwardly as at 73 and 74, so as to form smooth guides for a strip of film leaving the shell 56. A stretch of picture film 75 having different pictures arranged in sections thereon may be utilized for projection purposes, and is confined within the shell 56 and conducted therefrom through the slit 72 into one end of the channel or groove 24, thence through the channel, and received upon a suitable winding spool, as will be explained hereinafter.

The film stretch may be wound upon the spool 63 and unreeled therefrom through the slit 72 and into the guide or channel 24, as shown in Figure 2, or the spool may be discarded and the coiled strip of film disposed directly in the shell 56 as shown in Figure 4, and thence conducted through the slit 72 into the channel 24. The film strip or stretch may have rows of apertures 76 along its edges, as shown in Figures 2 and 3 for example, by which it may be propelled or shifted, as in motion picture machines. The stretch of film is conducted through the channel 24 between the plate 36 and the block or plate 41. Thus the film section between the plate 36 and the block 41 will always be held undeformed and flat, so that when an image of the picture carried thereby is projected in a manner to be explained shortly, the image will be undistorted because the film section under projection will be undeformed.

Bearing ears 77 depend from the plate 21 (see Figs. 2, 3, and 8) and receive between them a drum 78 having teeth 79 running peripherally therewith at spaced points along its length. The teeth 79 are arranged at such points along the drum that they will engage with the apertures 76 in the film and propel the film strip through the channel whenever the drum is rotated. The drum is secured in any suitable manner, such as by a set screw 80, upon a shaft 81 which is rotatably mounted in the bearing ears 77. Thus whenever the shaft 81 is rotated, the drum 78 will be rotated and the film strip propelled along the channel. An operating button 82 upon the end of the shaft 81 which is in proximity to the closure 12 facilitates manual rotation of the shaft 81 when movement of the film is desired.

A gear 83 is secured upon the rear end of the shaft 81, such as by a set screw 84, and prevents endwise movement of the shaft 81 in one direction, and a collar 85 fixed upon the shaft 81 by a set screw 86 adjacent to one of the bearing ears 77, prevents endwise movement of the shaft 81 in the opposite direction.

A stud 87 (Fig. 9) is threaded into a projecting abutment 88 on the inner face of the side wall in the casing opposite the closure, as shown in Figure 9, and at its free end is provided with a threaded recess for receiving a screw 89, for a purpose which will appear presently. A sleeve 90 is rotatably confined upon the stud 87 by the head of the screw 89 which overlies slightly the outer end of the sleeve 90, as shown in Figure 9. A second sleeve 92 is mounted upon the sleeve 90 and at its outer end carries a flange 93. A third sleeve 94 is in turn mounted upon the sleeve 92, although its bore is slightly larger than the external diameter of the sleeve 92, and at one end carries a flange 95. Thus when the sleeves 92 and 94 are arranged in telescopic relation with each other, as shown in Figure 9, the two flanges 93 and 95 will serve as the flanges for a spool having as a core the two telescopic flanges 92 and 94. A bushing 96 may be disposed between the gear 91 and sleeve 94 in order to limit the movement of the spool formed by the flanges 93 and 95 along the sleeve 90.

The sleeve 90 is preferably provided with a resilient hump 97 (Fig. 10) which may conveniently be formed by slitting the sleeve intermediate of its ends for a short distance in a direction lengthwise and then drawing outwardly somewhat the tongue formed by the two of such substantially parallel slits. Then when the sleeve 92 is forced over the sleeve 90, the hump 97 will be pressed inwardly and will frictionally grip the interior of the sleeve 92, hold it thereon, and serve as a frictional driving connection therewith. The sleeve 94 is also provided with a longitudinally extending slit 98 (see Fig. 4) which receives an end of the film strip 75. The end of the film strip which passes through the slit 98 will be wedged against the bore of the sleeve 94 by the sleeve 92 which is in telescopic relation therewith, and thus a very effective and simple anchorage is obtained between the film strip and the receiving spool formed by the sleeves 92 and 94 and the flanges 93 and 95. If desired the walls of the slit 98 may be bevelled, as shown in Figure 4, in order to prevent injury to the film strip.

From the preceding description it will be obvious that when the button 82 is rotated, the film strip will be drawn through the channel 24, and at the same time that the film is drawn through the channel, the receiving spool defined by the flanges 93 and 95 will be frictionally driven through the gears 83 and 91. The driving ratio between the gears 83 and 91 is such that the strip will be wound upon the core of the spool at a rate sufficient to prevent any material slackness between it and the guide. When the diameter of the spool core increases by reason of the increase in the number of successive turns of the film strip which are wound thereon, the spool will tend to draw the film faster than it is being pulled through the guide, but owing to the frictional driving connection between the gear 91 and the spool, the spool will only turn sufficiently to keep the film strip taut between it and the guide, and no injury to the film strip will result.

The film strip is provided with successively arranged picture sections which are to be projected, and the different picture sections should be positioned properly with respect to the windows 39 and 40 in order to have them properly framed when projected. Accordingly, I have provided means for indicating the conclusion of different increments of movement of the film strip, which increments correspond to the distance between the successive picture sections. In view of the fact, however, that it is difficult to insert a film for projection and have it properly positioned or framed with respect to the windows 39 and 40, some provision should preferably be made for adjustment between the indicating means and the film operating means. Accordingly, I may provide upon the shaft 81, a friction element 99 which may be keyed to the shaft for rotation therewith in any suitable manner, such as by a pin 100 driven radially through the friction element and an aperture in the shaft, as shown in Figure 3.

A short cylinder 101 is rotatably mounted upon the shaft 81 between the washer 99 and the collar 85, with a split or spring washer 102 interposed under compression between the collar 85 and the cylinder 101. Thus, the spring or split washer will press the cylinder 101 yieldingly against the washer or friction element 99 and create a frictional driving connection between the cylinder 101 and the shaft. A sleeve or button 103 may be secured to the outer end face of the cylinder 101 in any suitable manner, such as by screws 104, and will be, in effect, a part of the cylinder 101 and rotate therewith. The button 103 may extend over and beyond the friction element or washer 99. The sleeve or button 103 will serve as a framing button, and together with the cylinder 101 will normally rotate with the shaft 81, but at any time may be adjusted relatively to the shaft 81 by reason of the frictional driving connection therewith. The cylinder 101 is provided with one or more notches 105, in its periphery, the number depending upon the lengths of the increments of movement which are to be given to the movement.

A leaf spring 106 is secured at one end in any suitable manner, such as by a screw 107, to the plate 21, with the free end of the spring extending somewhat tangentially of the cylinder 101. The spring 106, at a point intermediate of its ends and nearest to the cylinder 101, is buckled upon itself slightly so as to provide a hump 108 which bears upon the surface of the cylinder 101 and rides thereon during the rotation of the cylinder. The size of the hump 108 is such that it will drop into the notches 105 sucessively as they move into alignment with it and be cammed out again as the cylinder continues to rotate. The yielding drag or opposition caused by the engagement of the hump 108 in the notches 105 serves to indicate to the operator the completion of an increment of film movement, which should place a film section in proper framed relation to the windows 39 and 40.

Referring to Figure 1, any suitable source of light for projection purposes may be provided within the casing 10, but one of such sources is indicated by the lamp 109 having a filament 110 positioned in proper relation to the condensing lens device 46. A concave reflector or mirror 111 may be mounted behind the lamp so as to assist in concentrating the light from the lamp upon the lens device 46. For example, the mirror 111 may have a rearwardly extending tubular sleeve 112 which is threaded upon the free end of a stud 113, that is in turn threaded into a boss 114 of a wall of the casing, and locked therein by a lock nut 115. By rotating the mirror 111 it may be threaded to various extents upon the stud 113, and thus adjusted toward and from the filament 110 of the lamp.

The lamp 109 may be supported in a suitable socket 116, which is mounted in a suitable projection 117, being removably confined to such projection in any suitable manner such as by a removable plate 118 and screws 119 which pass through the plate 118 and into the projection 117. Circuit wires 120 lead from the socket to a suitable connection device 121 provided in a compartment 122 of the casing, connection to the device 121 being made by a suitable plug device 123, the specific details of which are immaterial in the present invention.

In one of the side walls of the casing which extends approximately parallel to the plate 21, I preferably mount a cylinder or sleeve 124, (Figs. 1 and 4), the sleeve extending rearwardly into the casing sufficiently to provide a good bearing surface for an objective device, and at its outer end carries a flange 125 which fits against the outer face of the casing wall, being secured to the casing wall in any suitable manner, such as by rivets 126. In the cylinder or sleeve 124 I mount a suitable focusing or objective lens element which may be adjusted toward and from the film guide by sliding it into and out of the casing to various extents. Such a focusing device may comprise a cylinder 127 slidably fitting the bore of the sleeve 124 and having intermediate of its ends an internal annular abutment 128. When the cylinder 127 is formed of sheet or thin metal, the abutment 128 may be readily formed by spinning therein an internal bead.

An objective lens 129 is disposed in the cylinder 127 against the abutment 128, and may be confined thereagainst such as by ring or bushing 130 (see Fig. 4) and a short sleeve 131, the latter being threaded into the outer end of the cylinder 127. The sleeve 131 may have an external peripheral flange 132 which, by striking against the outer face of the sleeve 124 limits the inward movement of the cylinder 127, but nevertheless permits movement of the cylinder 127 almost entirely into the sleeve 124 and the casing. If desired, a spacing ring 133 may be provided around the cylinder 127 between the outer flanged end thereof and the sleeve 124, so that the flange 132 will strike against the ring when pushed inwardly to the maximum extent. This spacing provided by the ring 133 facilitates the grasping of the outer end of the cylinder 127 when the latter is to be drawn outwardly in the focusing operation.

In order to limit the outward movement of the cylinder 127, its inner end may have a tongue 134 struck outwardly therefrom, as shown in Figure 4, which tongue by striking against the inner end of the sleeve 124 serves as a limit stop for the cylinder 127. The cylinder 127 is mounted in alignment with the windows 39 and 40, so that the image of the film section in alignment with the windows 39 and 40 at any time will be projected through the cylinder and focused upon a suitable screen by the objective lens 129. By shifting the cylinder 127 into and out of the casing to various extents, the focusing of the image upon the external screen may be varied until a sharp image upon such screen is obtained.

The wall of the closure 12 is provided with an aperture 135 through which the operating buttons 103 and 82 project. The outer end face of the button 82 is substantially flush with the outer face of the closure and a section of the closure wall around the buttons 82 and 103 is depressed or formed inwardly as at 136 (see Figure 2), so that both buttons 82 and 103 will be exposed in the depression for manipulation without the necessity of removing the closure. The buttons 82 and 103 are located within the limits of the casing so as to be protected thereby, and will not extend beyond the faces of the casing, or interfere with the packing of the device in a suitable carrier.

In the use of a projection device constructed in the manner hereinbefore described, the free end of the film strip which is to be projected is inserted through the slit 98 of the sleeve 94 of the receiving spool and clamped against the bore of that spool by the sleeve 92 of the same spool which is inserted into the sleeve 94, as shown in Figure 4. This receiving spool is then forced over the sleeve 90 so as to be frictionally connected thereto. The latch 29 is sprung to release the door 26, and the latter is swung rearwardly to expose the film channel or guide groove 24. The film strip is then inserted edgewise into the channel so as to lie against the transparent plate 36, and is also inserted edgewise through the slit 72 of the shell 56. The main body of the film is at the same time passed into the shell 56 so as to be stored therein and delivered therefrom through the slit 72 to the upper end of the film guide.

If the film comes without a spool, it may be inserted into the shell 56 directly, as shown in Figure 4, in which case it will expand and substantially fill the casing. If the film supply is carried upon a spool, such as 63, the spool will be slid over the stud 58 and confined thereon by the operating element 64 which may be slid over the free end of the stud and yieldingly confined thereon by the engagement of the spring ball 69 with the annular groove 61. The door 26 is then swung into closed position, that is to say, in a position to close the channel, in which position the hump 31 of the spring 29 snaps into the depression 32 and locks the door closed. The transparent block or plate 41 will yieldingly press the film strip section that is in the channel against the transparent plate 36 and hold that particular film section which is aligned with the windows 39 and 40 perfectly flat and undeformed against the transparent plate 36.

When current is supplied to the lamp filament 110, the light rays from the lamp will be concentrated, with the assistance of the mirror 111, by the condensing device 46. An image of the film section across the windows 39 and 40 will be projected through the objective lens 129, and by shifting the cylinder 127 into and out of the casing the image may be focused from a suitable screen. By turning the button 82 the drum 78 will be rotated, and by reason of the engagement of the teeth 79 with the film strip the latter will be drawn through the channel and a new picture section of the film positioned in projection position across the windows 39 and 40. During such movement the receiving spool will be frictionally driven in a direction to take up the slack film drawn through the guide, and the spring indicator 106 will move out of one notch 105 and drop into another. By snapping into a notch the spring 106 will indicate to the operator the conclusion of an increment of movement and the knowledge that another film picture section is properly framed.

If, as is frequently the case, a film section when first inserted does not have the picture section properly framed, the attendant will grasp the button 103 and hold it against operation while turning the button 82 to draw the film through the guide channel until the picture section of the film is properly framed. Thereafter, to change picture sections, all that is necessary is to merely rotate the button 82 until the spring 106 snaps into a new notch 105. If the film strip is mounted upon a spool 63 it may be rewound thereon after being largely drawn therefrom through the guide, by merely turning the operating element 64 in a direction to draw the film strip back through the channel guide, which operation may be assisted by turning concomitantly the button 82 is a direction reverse to the normal advance operation heretofore referred to.

A simple projection device such as illustrated and described herein and a supply of films may be advantageously utilized by salesmen to give interesting and complete discussions of the products of their line, or to explain the details of manufacture of any products. Lecturers also will find that such a device and films may be carried about with them and utilized to illustrate their talks. Various other uses will be obvious. Such devices may also be operated without special skill, and with safety.

It will be obvious that various changes in the details, which have been herein described and illustrated in order to explain the nature of the invention, may be made by those skilled in the art within the principle and scope of the invention as expressed in the appended claims.

I claim:

1. A projection device comprising a casing having a removable side wall, projection mechanism carried within the casing and having supports for a film strip carried by the side wall opposite the removable wall, and operating means for said projection mechanism for feeding the film strip through projecting positions, said operating means including a plurality of operating elements extending through the removable side wall, one of said elements being movable relative to the other for framing the film.

2. A projection device comprising a casing having a removable side wall, projection mechanism carried within the casing and having supports for a film strip carried by the side wall opposite the removable wall, and operating means for said projection mechanism for feeding the film strip through projecting positions, said operating means including a plurality of operating elements extending through the removable side wall, one of said elements being adjustable relative to the other for varying the position of the film for framing the same, said removable wall having a depressed area surrounding the operating elements, with said operating elements received flush in said depression, whereby external projections will be countersunk with the casing.

3. A projection device comprising a casing, a film guide mounted within the casing, projecting means associated with the film guide for projecting an image of the particular film section which is in projection position in said guide at any time, a feeding device associated with said guide for propelling the film therethrough, means for indicating the conclusion of successive increments of film movements in order to secure proper framing of the successive film sections, said indicating means being adjustable relatively to the feeding device for varying the framing of any film section.

4. In a projection device, projection means, means for supporting a film in projection position relative to said projection means, means for propelling the film through the field of projection so as to bring successive picture sections thereof into projection positions, said propelling means including a rotary element engaging with said film to propel it, operating means for said element, an indicating element frictionally driven from said operating element, and means associated with said indicating element and cooperating therewith for indicating the completion of film propelling movements of a predetermined extent, said frictional driving connection between the indicating element and said propelling element permitting relative adjustment of the same, whereby the indicating means becomes effective at the instant any picture section is properly framed in said field of projection.

5. In a projection device for a film strip of the type having apertures along its margin, a guide for conducting said film strip in moving to present various picture sections thereof successively in projection positions, a drum mounted for rotation in proximity to said strip and having peripheral teeth engaging in the apertures of said film strip for propelling the strip lengthwise through the guide, a framing member frictionally connected to said rotary drum and having a notched peripheral portion, and a spring device riding upon the notched peripheral portion of the frame element and indicating by its engagement in a notch of the same, the completion of a predetermined increment of a frame propelling movement, said frictional connection permitting movement of the drum independently of the framing element, in order to vary the framing of the film sections.

WILLIAM L. PATTERSON.